US010732868B2

(12) United States Patent
Chen et al.

(10) Patent No.: US 10,732,868 B2
(45) Date of Patent: Aug. 4, 2020

(54) IMPLEMENTING A BASE SET OF DATA STORAGE FEATURES FOR CONTAINERS ACROSS MULTIPLE CLOUD COMPUTING ENVIRONMENTS

(71) Applicant: Red Hat, Inc., Raleigh, NC (US)

(72) Inventors: Huamin Chen, Westford, MA (US); Bradley D. Childs, Austin, TX (US)

(73) Assignee: Red Hat, Inc., Raleigh, NC (US)

( * ) Notice: Subject to any disclaimer, the term of this patent is extended or adjusted under 35 U.S.C. 154(b) by 182 days.

(21) Appl. No.: 16/053,428

(22) Filed: Aug. 2, 2018

(65) Prior Publication Data
US 2020/0042214 A1 Feb. 6, 2020

(51) Int. Cl.
*G06F 3/06* (2006.01)
*G06F 13/16* (2006.01)

(52) U.S. Cl.
CPC .......... *G06F 3/0632* (2013.01); *G06F 3/0604* (2013.01); *G06F 3/067* (2013.01); *G06F 3/0644* (2013.01); *G06F 13/1668* (2013.01)

(58) Field of Classification Search
CPC ...... G06F 3/0632; G06F 3/0644; G06F 3/067; G06F 3/1668; G06F 3/0604
See application file for complete search history.

(56) References Cited

U.S. PATENT DOCUMENTS

| | | | | |
|---|---|---|---|---|
| 5,630,076 A | * | 5/1997 | Saulpaugh | G06F 9/4411 710/10 |
| 5,802,365 A | * | 9/1998 | Kathail | G06F 9/4411 710/10 |
| 9,122,697 B1 | | 9/2015 | Bono et al. | |
| 9,736,013 B2 | | 8/2017 | Markley et al. | |
| 9,818,127 B2 | | 11/2017 | Iyoob et al. | |
| 2014/0366155 A1 | | 12/2014 | Chang et al. | |
| 2017/0279797 A1 | * | 9/2017 | Cross, Jr. | H04L 63/0435 |
| 2017/0344270 A1 | * | 11/2017 | Sterin | G06F 3/0631 |

(Continued)

OTHER PUBLICATIONS

C. Pahl, A. Brogi, J. Soldani and P. Jamshidi, "Cloud Container Technologies: A State-of-the-Art Review," in IEEE Transactions on Cloud Computing, vol. 7, No. 3, pp. 677-692, Jul. 1-Sep. 2019. (Year: 2019).*

(Continued)

*Primary Examiner* — Ramon A. Mercado
(74) *Attorney, Agent, or Firm* — Withrow & Terranova, PLLC (57) ABSTRACT

Implementing a base set of data storage features for containers across multiple cloud computing environments. A container specification analyzer receives a container specification that identifies a container to be initiated, a volume to be mounted, and a native device driver to communicate with to facilitate mounting the volume. The container specification analyzer changes the container specification to generate an updated container specification that identifies a pass-through device driver to communicate with in lieu of the native device driver and identifies pass-through device driver data that identifies a data storage feature to be performed on data destined for the native device driver. The container specification analyzer returns the updated container specification for processing by a container initiator.

20 Claims, 9 Drawing Sheets

(56) References Cited

U.S. PATENT DOCUMENTS

2018/0060106 A1   3/2018  Madtha et al.
2019/0369895 A1*  12/2019  Israni .................... G06F 3/0665

OTHER PUBLICATIONS da Silva, Vitor Goncalves, Marite Kirikova, and Gundars Alksnis. "Containers for virtualization: An overview." Applied Computer Systems 23.1 (2018): 21-27. (Year: 2018).*

Kang, Hui, Michael Le, and Shu Tao. "Container and microservice driven design for cloud infrastructure devops." 2016 IEEE International Conference on Cloud Engineering (IC2E). IEEE, 2016. (Year: 2016).*

Lai, Lawrence, et al., "OpenSDS—An Industry Wide Collaboration for SDS Management," Storage Developer Conference, 2017, Santa Clara, California, Open SDS, 31 pages.

Niazi, Haseeb, et al., "FlexPod Datacenter for Hybrid Cloud with Cisco CloudCenter and NetApp Private Storage Design Guide," Product Details, Jun. 22, 2017, Cisco Systems, Inc., 57 pages.

Stanley, Robert, "Advice for Companies Moving to the Cloud and Common Misconceptions and Tips," www.clicksoftware.com/blog/advice-for-companies-moving-to-the-cloud-and-common-misconceptions-and-tips, Sep. 17, 2013, ClickSoftware, 34 pages.

\* cited by examiner

IMPLEMENTING A BASE SET OF DATA STORAGE FEATURES FOR CONTAINERS ACROSS MULTIPLE CLOUD COMPUTING ENVIRONMENTS

TECHNICAL FIELD

The examples relate generally to containers, and in particular to implementing a base set of data storage features for containers across multiple cloud computing environments.

BACKGROUND

Cloud computing environments are increasingly popular for use as a service delivery mechanism. For many reasons, such as redundancy, cost, and flexibility, it is increasingly common for an entity to implement services via multiple different cloud computing environments.

SUMMARY

The examples implement a base set of data storage features for containers across multiple cloud computing environments. In particular, the examples ensure that a set of data storage features, such as one or more of an encryption data storage feature, a deduplication data storage feature, an integrity data storage feature, a replication data storage feature, a thin-provisioning data storage feature, and a constant data protection data storage feature (e.g., continual snapshots of a volume) as examples, are implemented consistently irrespective of the container specification that identifies which data processing features are to be implemented, and irrespective of which cloud computing environment of multiple different cloud computing environments will be used to host the container, and irrespective of whether the cloud computing environments offer cloud data storage that natively offers the data storage features. The examples implement the base set of data storage features automatically without human involvement and without a need to change the underlying device driver associated with the physical volume that stores the data.

In one example a method is provided. The method includes receiving, by a container specification analyzer executing on a computing device comprising a processor device, a container specification that identifies a container to be initiated, a volume to be mounted, and a native device driver to communicate with to facilitate mounting the volume. The method further includes changing the container specification to generate an updated container specification that identifies a pass-through device driver to communicate with in lieu of the native device driver and identifies pass-through device driver data that identifies a data storage feature to be performed on data destined for the native device driver. The method further includes returning the updated container specification for processing by a container initiator.

In another example a system is provided. The system includes one or more computing devices, each comprising a memory and one or more processor devices coupled to the memory. The one or more processor devices are to receive, by a container specification analyzer, a container specification that identifies a container to be initiated, a volume to be mounted, and a native device driver to communicate with to facilitate mounting the volume. The one or more processor devices are further to change the container specification to generate an updated container specification that identifies a pass-through device driver to communicate with in lieu of the native device driver and identifies pass-through device driver data that identifies a data storage feature to be performed on data destined for the native device driver. The one or more processor devices are further to return the updated container specification for processing by a container initiator.

In another example a computer program product is provided. The computer program product is stored on one or more non-transitory computer-readable storage mediums and includes instructions to cause one or more processor devices to receive, by a container specification analyzer, a container specification that identifies a container to be initiated, a volume to be mounted, and a native device driver to communicate with to facilitate mounting the volume. The instructions further cause the one or more processor devices to change the container specification to generate an updated container specification that identifies a pass-through device driver to communicate with in lieu of the native device driver and identifies pass-through device driver data that identifies a data storage feature to be performed on data destined for the native device driver. The instructions further cause the one or more processor devices to return the updated container specification for processing by a container initiator.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Cloud computing environments are increasingly popular for use as a service delivery mechanism. For many reasons, such as redundancy, cost, and flexibility, it is increasingly common for an entity to implement services via multiple different cloud computing environments. For example, an entity may provide services through different cloud computing environments offered by different providers, as well as through a private enterprise cloud computing environment. Such environments are sometimes referred to as federated cloud computing environments.

Different cloud computing environments utilize different data storage types, and the different data storage types may or may not natively offer the same data storage features. For example, one cloud computing environment may utilize a data storage type than can natively implement a data integrity data storage feature, such as check summing, while a data storage type offered by another cloud computing environment may not. In another example, one cloud computing environment may offer a data encryption data storage feature while another may not. This may be, for example, because on-premise storage devices used in a private enterprise cloud computing environment may have capabilities that cloud storage types used by cloud computing environments lack. Thus, there are often mismatches between data storage features offered by different cloud computing environments in a federated cloud computing environment.

For a number of reasons, such as compatibility, auditing, and the like, it would be desirable for a process, such as a container, that is initiated in any of the cloud computing environments of a federated cloud computing environment to implement a base set of data storage features.

The examples implement a base set of data storage features for containers across multiple cloud computing environments. In particular, the examples ensure that a set of data storage features, such as one or more of an encryption data storage feature, a deduplication data storage feature, an integrity data storage feature, and a replication data storage feature, as examples, are implemented consistently irrespective of the container specification that identifies which data processing features are to be implemented, and irrespective of which cloud computing environment of multiple different cloud computing environments will be used to host the container, and irrespective of whether the cloud computing environments offer cloud data storage that natively offers the set of data storage features. The examples implement the base set of data storage features automatically without human involvement and without a need to change the underlying device driver of the physical volume where the data is stored.

The examples facilitate an improvement to computer functionality itself via a container specification analyzer and a pass-through device driver. Thus, the examples are directed to specific improvements in computer functionality.

Figure 1:
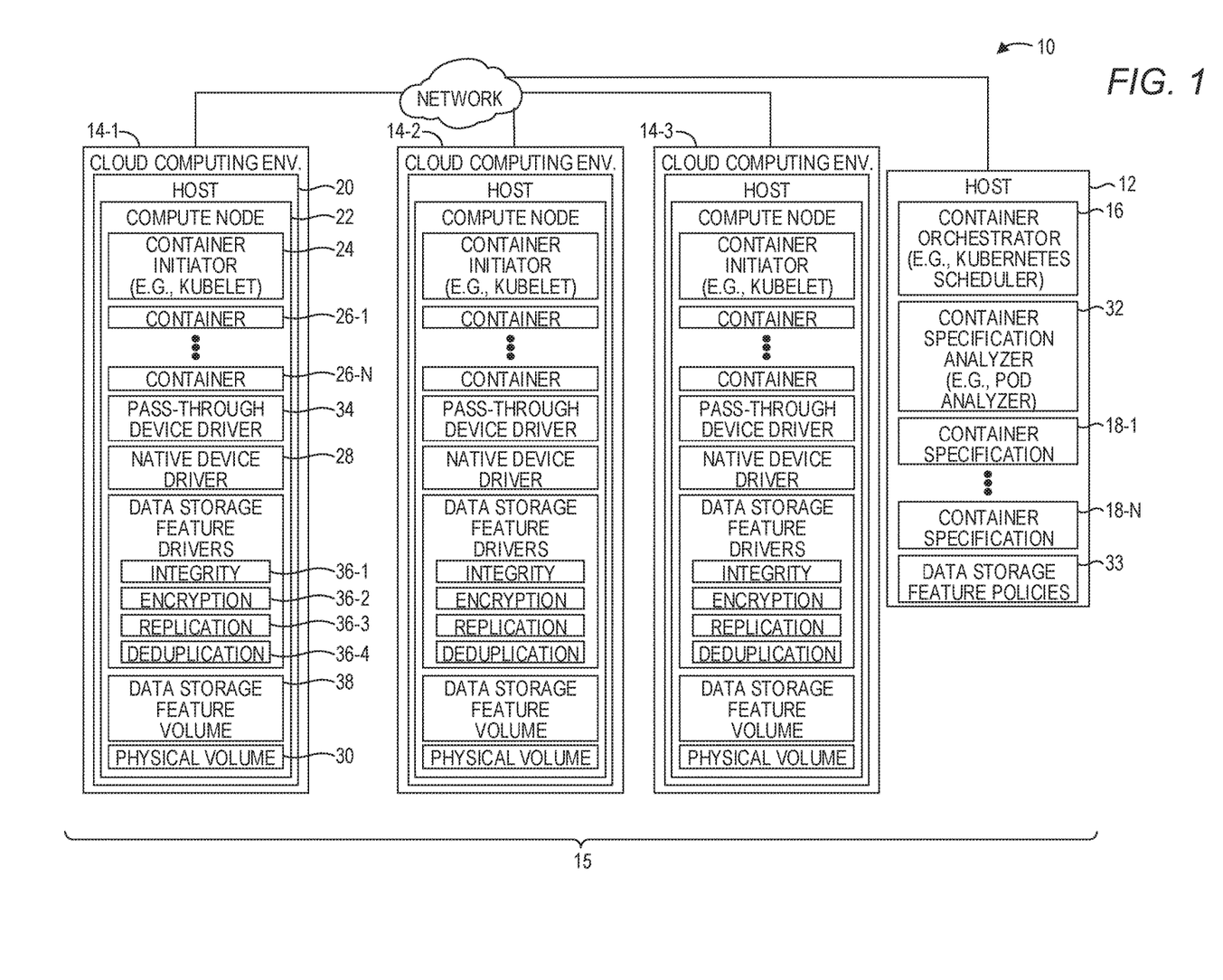
FIG. 1 is a block diagram of an environment in which examples may be practiced.

FIG. 1 is a block diagram of an environment 10 in which examples may be practiced. The environment 10 includes a computing host 12 (hereinafter "host 12" for purposes of brevity) and a plurality of cloud computing environments 14-1-14-3 (generally, cloud computing environments 14). The host 12 may comprise, for example, a physical computing device or a virtual machine implemented in a physical computing device. Although for purposes of illustration the host 12 is illustrated as being separate from the cloud computing environments 14, in practice, the host 12 may be either separate from the cloud computing environments 14 or may be implemented in one of the cloud computing environments 14. The cloud computing environments 14 are implemented via different entities in different data centers. For example, the cloud computing environment 14-1 may comprise a third-party Amazon® Amazon Web Services (AWS) cloud computing environment; the cloud computing environment 14-2 may comprise a private enterprise cloud computing environment; and the cloud computing environment 14-3 may comprise a third-party Microsoft® Azure cloud computing environment.

The host 12 includes a container orchestrator 16 that manages, or orchestrates, the initiation of containers in the cloud computing environments 14. Because the container orchestrator 16 may orchestrate the initiation of containers in multiple cloud computing environments 14, the environment 10 may sometimes be referred to as a federated cloud computing environment 15. While the examples have applicability with any container orchestration system, in some examples the container orchestrator is the Kubernetes scheduler container orchestrator. The term "container" as used herein refers to a stand-alone, executable package of a piece of software that includes all resources to run the software, including code, runtime, system libraries, and settings, and that are implemented via a containerization technology, such as, by way of non-limiting example, Docker containerization technology or Linux LXC containerization technology, or the like. The examples disclosed herein also have applicability in the context of runV technology. The term "container orchestration" as used herein refers to systems and technologies that manage the runtime initiation of containers in response to various inputs and/or criteria, and may comprise, by way of non-limiting example, the Kubernetes container orchestration technology, Apache Meso container orchestration technology, Docker Swarm container orchestration technology, Openshift container orchestration technology, or the like.

The container orchestrator 16 iteratively obtains, receives, or otherwise accesses a plurality of container specifications 18-1-18-N (generally, container specifications 18). The container orchestrator 16 then provides each container specification 18 to one of the cloud computing environments 14 based on any desired distribution mechanism. Generally, a container specification 18 identifies one or more containers that are to be initiated, and may include multiple other parameters and/or attributes that define the runtime environment of such containers, such as volumes to be mounted and used by the containers, a location of the container package, and the like.

As an example of typical processing of a container specification 18, assume that the container orchestrator 16 sends the container specification 18-1 to the cloud computing environment 14-1 for processing. Note that this could be based on a decision made by the container orchestrator 16, or in response to some input from the cloud computing environment 14-1, such as an indication from the cloud computing environment 14-1 that the cloud computing environment 14-1 has the capability to process the container specification 18-1 and initiate the containers identified therein.

The cloud computing environment 14-1 includes a host 20 designated as a compute node 22 on which containers may be initiated. The host 20 may comprise, for example, a physical computing device or a virtual machine implemented in a physical computing device. A container initiator 24 executes on the host 20. The container initiator 24 receives the container specification 18-1, interprets the container specification 18-1, and initiates, for example, one or more containers 26-1-26-N (generally, containers 26) identified in the container specification 18-1. As part of the processing of the container specification 18-1, the container initiator 24 communicates with a native device driver 28 to physically connect a physical volume 30 from a cloud storage device to the host 20, and mounts the physical volume 30 into the containers 26-1-26-N. The native device driver 28 may implement a native storage technology, such as iSCSI, Fibre Channel, or the like.

While the container specifications 18 can comprise any suitable syntax or format that identifies containers to be initiated along with runtime parameters, in some examples the container specifications 18 comprise a Kubernetes Pod specification and follow the Kubernetes Pod specification syntax identified at kubernetes.io. Note that the cloud computing environments 14-2 and 14-3 process a container specification 18 in a substantially similar manner as that described above with regard to the cloud computing environment 14-1.

Note that by default, the cloud data storage provided by each cloud computing environment 14 may natively offer only certain data storage features for a container 26 executing in the respective cloud computing environment 14. For example, the cloud computing environment 14-1 may offer an encryption data storage feature, the cloud computing environment 14-2 may offer an integrity verification data storage feature, and the cloud computing environment 14-3 may offer a replication data storage feature. If a container specification 18 identifies a data storage feature not offered by the cloud computing environment 14, the cloud computing environment 14 does not provide the data storage feature to the container 26.

The examples disclosed herein, as discussed above, implement mechanisms for implementing a base set of data storage features for containers 26 implemented across the cloud computing environments 14, irrespective of the native data storage features offered by the cloud computing environments 14. In particular, the examples ensure that an identified base set of data storage features, such as one or more of an encryption data storage feature, a deduplication data storage feature, an integrity data storage feature, and a replication data storage feature, as examples, are implemented irrespective of what data storage features are identified in a container specification 18, and irrespective of which cloud computing environment 14 of the multiple different cloud computing environments 14 will be used to host the container 26.

In one example, a container specification analyzer 32 receives a container specification 18 prior to being distributed by the container orchestrator 16 to a cloud computing environment 14. Where the container specification analyzer 32 is a separate component from the container orchestrator 16, as illustrated in FIG. 1, this may be implemented via any inter-process communication mechanism, such as a socket, an application programming interface (API), or the like. In some examples, the container orchestrator 16 may allow components, such as the container specification analyzer 32 to register with the container orchestrator 16 to receive a container specification 18 and implement processing on the container specification 18, including the modification of the container specification 18, prior to being distributed by the container orchestrator 16 to a cloud computing environment 14. In other examples the functionality described herein with regard to the container specification analyzer 32 may be integrated into the container orchestrator 16.

The container specification analyzer 32 analyzes the container specification 18, changes the container specification 18, and generates an updated container specification that implements a base set of data storage features irrespective of the cloud computing environment 14 that will ultimately process the updated container specification. In one example, the base set of data storage features may be defined in data storage feature policies 33. In other examples, the container specification 18 may be initiated with parameters that identify the base set of data storage features.

The container specification analyzer 32 changes the updated container specification to identify a pass-through device driver 34 for the container initiator 24 to communicate with in lieu of the native device driver 28. The container specification analyzer 32 also includes pass-through device driver data that identifies a data storage feature to be performed on data destined for the native device driver 28. For example, if the base set of data storage features is the encryption data storage feature, the pass-through device driver data identifies the encryption data storage feature. The container specification analyzer 32 then returns the updated container specification to the container orchestrator 16 for eventual processing by the container initiator 24.

The container initiator 24 receives the updated container specification from the container orchestrator 16 and processes the updated container specification. The pass-through device driver 34 is written to conform with a standardized device driver interface. In one example, the standardized device driver interface is the Container Storage Interface (CSI) specification available at github.com/container-storage-interface/spec. The native device driver 28 is also written to conform with the standardized device driver interface. The container initiator 24 sends a native device driver instruction destined for the native device driver 28 to the pass-through device driver 34, and sends to the pass-through device driver 34 the pass-through device driver data that identifies the additional data storage feature to be performed on data destined for the native device driver 28. The container initiator 24 may send the native device driver instruction destined for the native device driver 28 in the form of a standardized function or method call implemented by the pass-through device driver 34. The pass-through device driver 34 is configured to receive native device driver instructions, and call or otherwise pass the native device driver instructions to the native device driver 28 for implementation, such as attachment of the physical volume 30 to the host 20 and related actions regarding the physical volume 30.

The pass-through device driver 34 also receives the pass-through device driver data that identifies the additional data storage feature to be performed on data destined for the native device driver 28. The pass-through device driver 34 then implements the additional data storage feature to be performed on the data destined for the native device driver 28.

One mechanism by which the pass-through device driver 34 implements the additional data storage feature to be performed on the data destined for the native device driver 28 involves the use of "device mapper," which is a framework provided by the Linux kernel for mapping physical devices onto virtual devices. In particular, the host 20 utilizes a plurality of device mapper targets that implement the respective data storage features. The device mapper targets discussed herein include data storage feature drivers 36-1-36-4 (generally, data storage feature drivers 36), each of which is used to implement a respective data storage feature. As an example, the data storage feature driver 36-1 may implement a data integrity data storage feature (e.g., dm-integrity). The data storage feature driver 36-2 may implement an encryption data storage feature (e.g., dmcrypt). The data storage feature driver 36-3 may implement a data replication data storage feature (e.g., drdb). The data storage feature driver 36-4 may implement a data deduplication data storage feature (e.g., VDO).

In this example, wherein the base set of data storage features is the encryption data storage feature, the pass-through device driver 34 utilizes device mapper and the data storage feature driver 36-2 (dmcrypt for encryption) to implement the encryption data storage feature for the containers 26-1-26-N. In particular, after the native device driver 28 mounts the physical volume 30 to the host 20, the pass-through device driver 34, using device mapper and the data storage feature driver 36-2, mounts a data storage feature volume 38 on top of the physical volume 30, and then returns the data storage feature volume 38 to the container initiator 24. The container initiator 24 then mounts the physical volume 30 into the containers 26-1-26-N during the initiation of the containers 26-1-26-N. The data generated by the containers 26-1-26-N is stored in the physical volume 30, but because the containers utilized the data storage feature volume 38 which implemented the encryption data storage feature, such data is encrypted in accordance with the base set of data storage features. If the base set of data storage features had included additional data storage features, such as the integrity data storage feature, the pass-through device driver 34, using the data storage feature driver 36-1 (dm-integrity for integrity), would have mounted an additional data storage feature volume to implement the integrity data storage feature. Note that the data storage feature drivers 36 can be used to implement such data storage features (sometimes referred to as "frontend data storage features") even if the cloud storage device on which the physical volume 30 is located does not natively (sometimes referred to as "backend data storage features") offer such data storage features.

The cloud computing environments 14-2-14-3 are configured to operate in the same manner as discussed above with regard to the cloud computing environment 14-1. In this manner, the container specification analyzer 32 in conjunction with the pass-through device driver 34 in each of the cloud computing environments 14-1-14-3 are able to implement any desired base set of data storage features on any data generated on any of the cloud computing environments 14-1-14-3, irrespective of whether the native storage devices of such cloud computing environments 14-1-14-3 offer such data storage features, and irrespective of the content of the container specifications 18.

Figure 2:
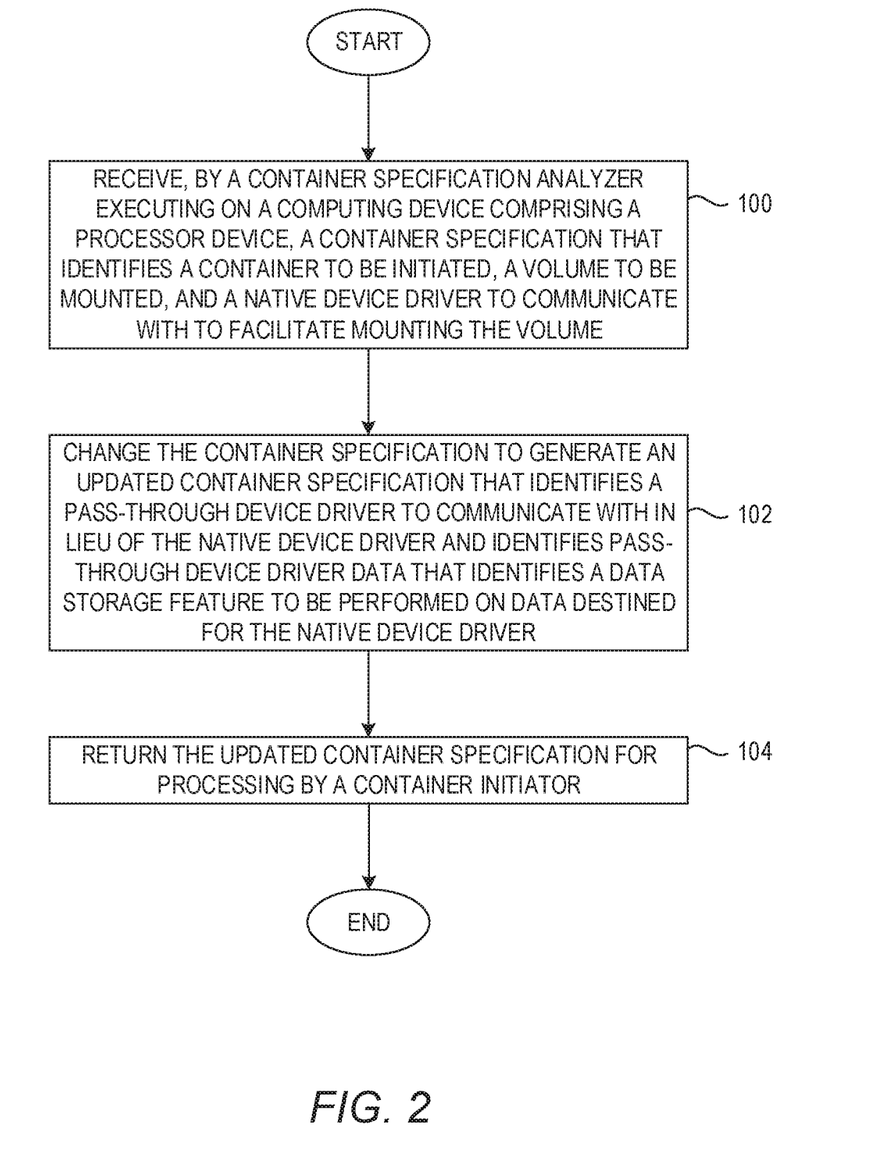
FIG. 2 is a flowchart of a method for implementing a base set of data storage features for containers across multiple cloud computing environments according to one example.

FIG. 2 is a flowchart of a method for implementing a base set of data storage features for containers across multiple cloud computing environments according to one example. FIG. 2 will be discussed in conjunction with FIG. 1. The container specification analyzer 32 receives the container specification 18-1 that identifies a container 26 to be initiated, a volume to be mounted, and the native device driver 28 to communicate with to facilitate mounting the volume (FIG. 2, block 100). The container specification analyzer 32 changes the container specification 18-1 to generate an updated container specification that identifies the pass-through device driver 34 to communicate with in lieu of the native device driver 28 and identifies pass-through device driver data that identifies a data storage feature to be performed on data destined for the native device driver 28 (FIG. 2, block 102). The container specification analyzer 32 returns the updated container specification for processing by the container initiator 24 (FIG. 2, block 104).

Figure 3A:
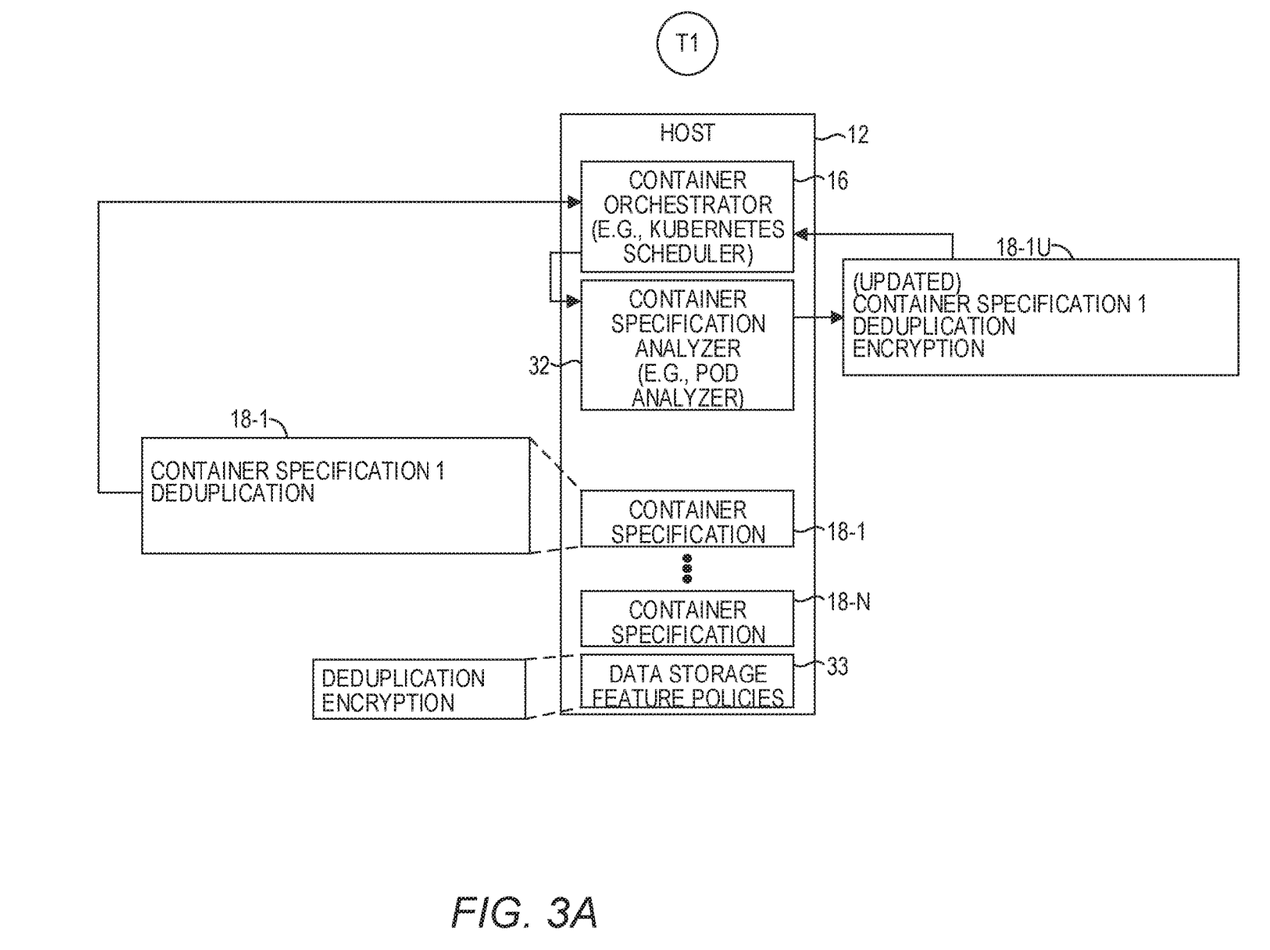
FIGS. 3A-3B are block diagrams illustrating the generation of updated container specifications in accordance with a base set of data storage features according to one example.

FIGS. 3A-3B are block diagrams illustrating the generation of updated container specifications in accordance with a base set of data storage features according to one example. Referring first to FIG. 3A, in this example the data storage feature policies 33 identify two data storage features that should be implemented on all container storage, a deduplication data storage feature and an encryption data storage feature. At a time T1, the container orchestrator 16 begins processing the container specification 18-1, which indicates that only the deduplication data storage feature is to be implemented. The container orchestrator 16 provides the container specification 18-1 to the container specification analyzer 32. The container specification analyzer 32 analyzes the container specification 18-1 and determines that only the deduplication data storage feature is identified. Based on the data storage feature policies 33, the container specification analyzer 32 changes the container specification 18-1 to generate a container specification 18-1U that indicates that both the deduplication data storage feature and the encryption data storage feature are to be implemented on data generated by the containers identified in the container specification 18-1U. The container specification analyzer 32 returns the container specification 18-1U to the container orchestrator 16, which then distributes the container specification 18-1U to a cloud computing environment 14 for processing.

Figure 3B:
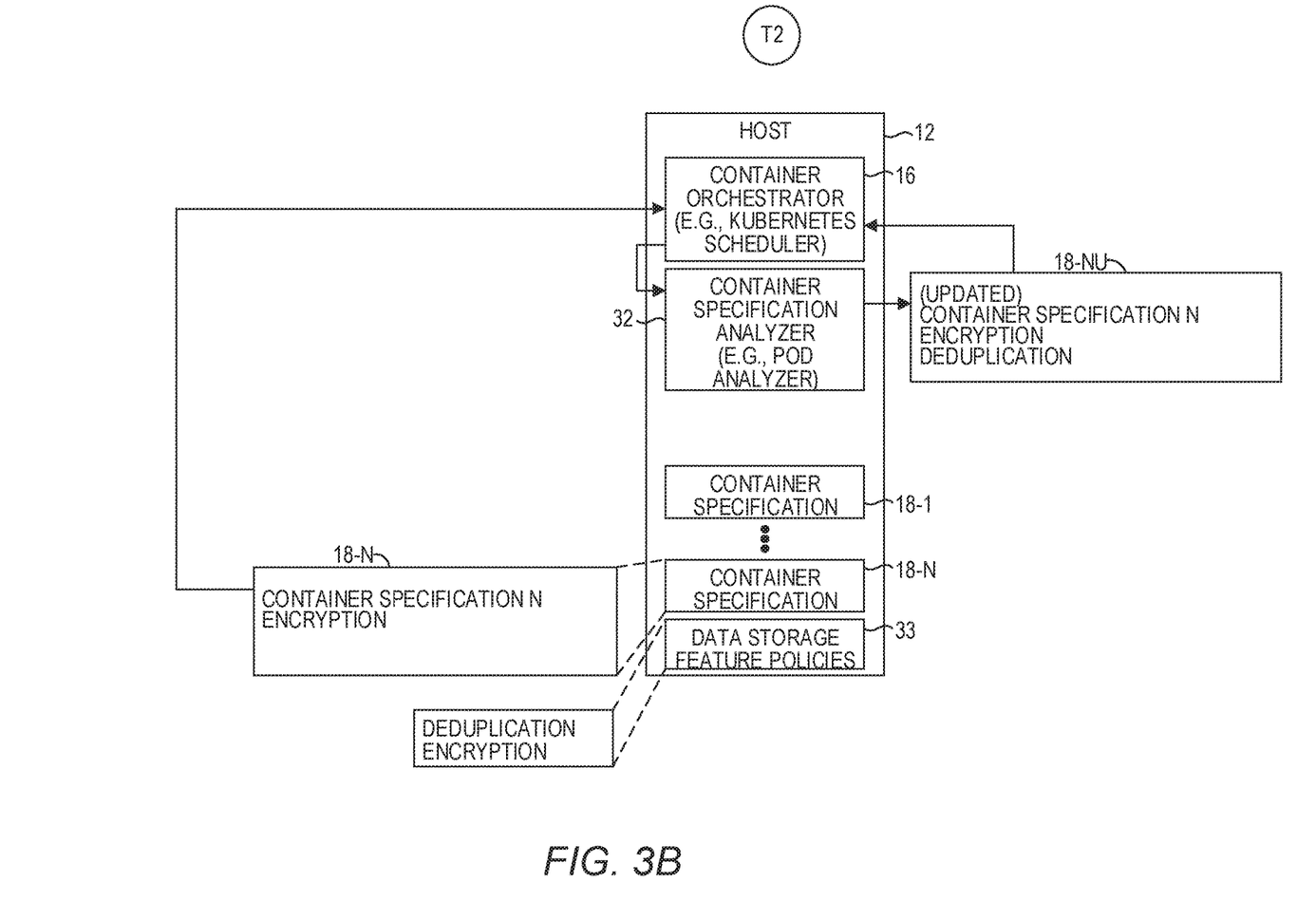

Referring now to FIG. 3B, at a time T2, the container orchestrator 16 begins processing the container specification 18-N, which indicates that only the encryption data storage feature is to be implemented. The container orchestrator 16 provides the container specification 18-N to the container specification analyzer 32. The container specification analyzer 32 analyzes the container specification 18-N and determines that only the encryption data storage feature is identified. Based on the data storage feature policies 33, the container specification analyzer 32 changes the container specification 18-N to generate a container specification 18-NU that indicates that both the deduplication data storage feature and the encryption data storage feature are to be implemented on data generated by the containers identified in the container specification 18-NU. The container specification analyzer 32 returns the container specification 18-NU to the container orchestrator 16, which then distributes the container specification 18-NU to a cloud computing environment 14 for processing.

Figure 4:
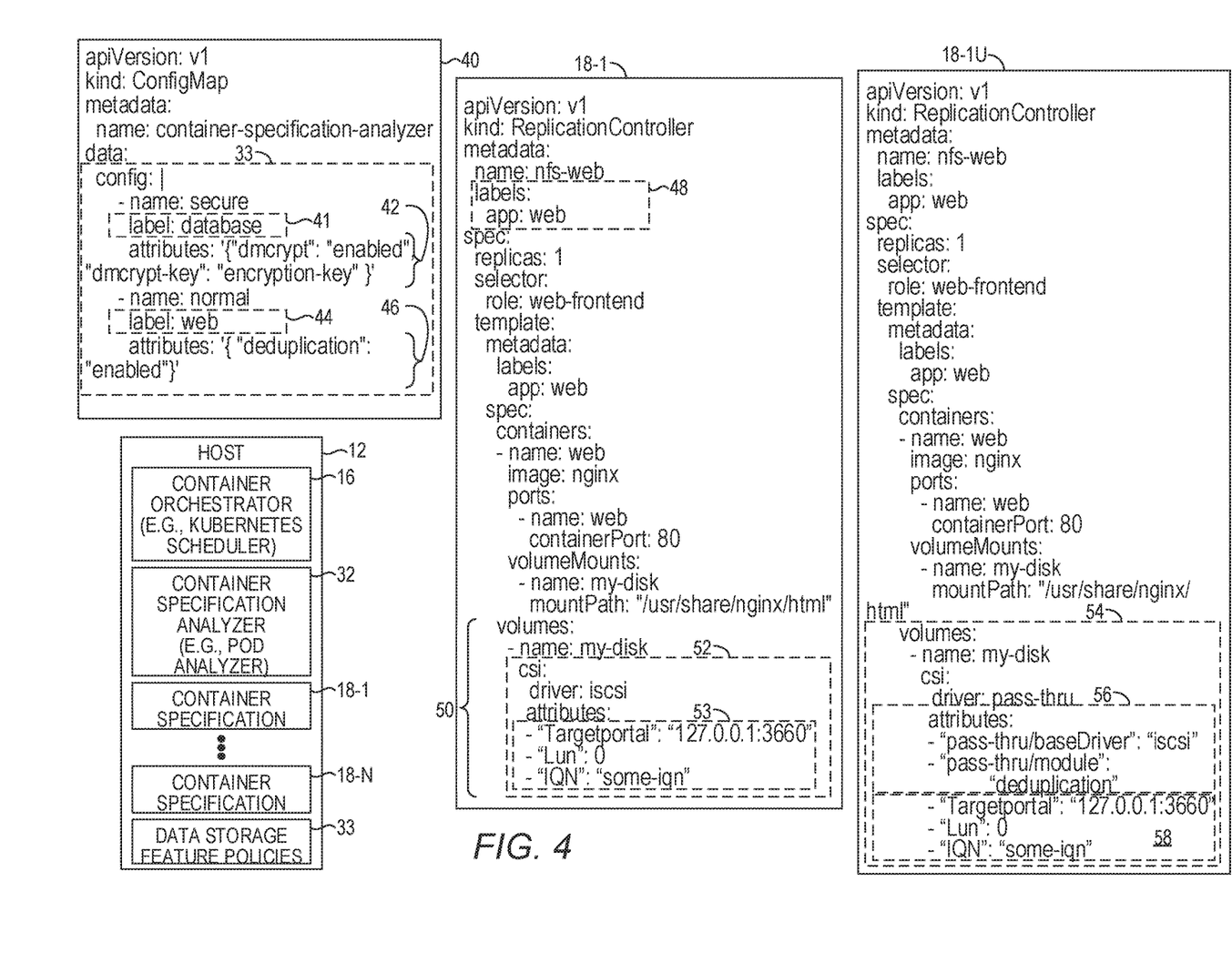
FIG. 4 is a block diagram illustrating the generation of an updated container specification in accordance with a base set of data storage features in greater detail according to another example.

FIG. 4 is a block diagram illustrating the generation of an updated container specification in accordance with a base set of data storage features in greater detail according to another example. In this example, the container specification analyzer 32 is a container, and the data storage feature policies 33 are provided to the container specification analyzer 32 at runtime. A container specification 40 identifies the container specification analyzer 32 as a container to be initiated by a container initiator 24, and the data storage feature policies 33 are provided to the container specification analyzer 32 upon initiation in the way of configuration data. The data storage feature policies 33 in this example are conditional. In particular, the data storage feature policies 33 indicate that if a container specification 18 contains a label 41 of "database," then attribute data 42 indicates that the encryption data storage feature is to be implemented on data. The attribute data 42 also includes a designated encryption key contained in a variable "encryption-key" that is to be used to encrypt the data. The data storage feature policies 33 also indicate that if a container specification 18 contains a label 44 of "web," then attribute data 46 indicates that the deduplication data storage feature is to be implemented on data.

The container specification analyzer 32 ultimately receives the container specification 18-1, which complies with the Kubernetes container specification syntax. In a labels section 48 of the container specification 18-1, the container specification 18-1 identifies a "web" label. The container specification analyzer 32 then determines that a volumes section 50 exists, which indicates that any containers identified in the container specification 18-1 may utilize external storage and thus that the deduplication data storage feature should be implemented on the identified volume (in this example, "my-disk"). The container specification 18-1 contains information 52 that identifies a native device driver 28 ("iSCSI") and various attributes 53 (e.g., Targetportal, Lun, IQN) associated with the native device driver 28.

The container specification analyzer 32 generates an updated container specification 18-1U that is a modified copy of the container specification 18-1. In particular, in a volumes section 54 of the container specification 18-1U, the container specification analyzer 32 replaces the native device driver 28 ("iSCSI") with the pass-through device driver 34 (called "pass-thru" in this example). The container specification analyzer 32 generates pass-through device driver data 56 in the form of attributes for the pass-through device driver 34 that identify the native device driver 28 ("iSCSI"), and that identify the deduplication data storage feature. The container specification analyzer 32 also includes a copy 58 of the attributes 53 (e.g., Targetportal, Lun, IQN) from the container specification 18-1 that are associated with the native device driver 28.

The container specification analyzer 32 then returns the container specification 18-1U to the container orchestrator 16 in place of the container specification 18-1. When a container initiator 24 in a cloud computing environment 14 processes the container specification 18-1U, based on the volumes section 54, the container initiator 24 will communicate with pass-through device driver 34 rather than the native device driver 28. The container initiator 24 will pass the pass-through device driver data 56 and the copy 58 of the attributes 53 (e.g., Targetportal, Lun, IQN) that are associated with the native device driver 28 to the pass-through device driver 34. The pass-through device driver 34 knows, based on the pass-through device driver data 56, to pass any native device driver instructions received from the container initiator 24 to the native device driver 28, and also provides the attributes 53 to the native device driver 28. The pass-through device driver data 56 also implements the deduplication data storage feature identified in the pass-through device driver data 56 via the device mapper framework and the data storage feature driver 36-4 as discussed above with regard to FIG. 1. Thus the pass-through device driver data 56 passes through to the native device driver 28 any calls from the container orchestrator 16 that are destined or intended for the native device driver 28, and implements the identified desired data storage feature in a manner that is completely transparent to the container orchestrator 16 and any containers 26, eliminating any need to revise or otherwise modify either the container orchestrator 16, any containers 26, or the container orchestrator 16.

Figure 5A:
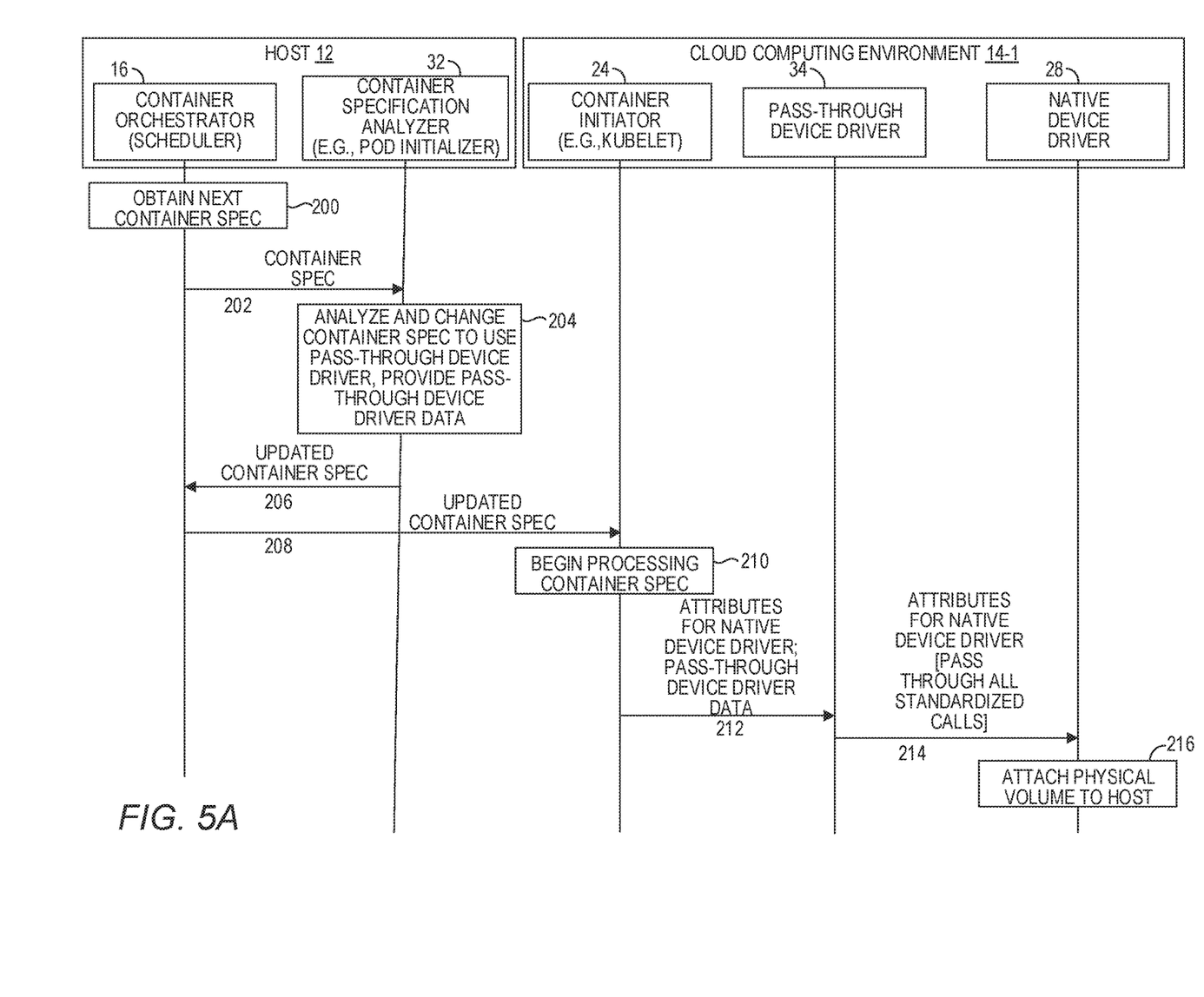
FIGS. 5A-5B are message flow diagrams that illustrate example message flow and processing of the environment illustrated in FIG. 1 according to one example.

FIGS. 5A-5B are message flow diagrams that illustrate example message flow and processing of the environment 10 illustrated in FIG. 1 according to one example. Referring first to FIG. 5A, the container orchestrator 16 obtains the container specification 18-1 (step 200). The container orchestrator 16 provides the container specification 18-1 to the container specification analyzer 32 (step 202). The container specification analyzer 32 analyzes the container specification 18-1 based on the data storage feature policies 33, and changes the container specification 18-1 to generate the updated container specification 18-1U. The updated container specification 18-1U identifies the pass-through device driver 34 and includes the pass-through device driver data 56 (step 204). The container specification analyzer 32 returns the updated container specification 18-1U to the container orchestrator 16 (step 206). The container orchestrator 16 distributes the updated container specification 18-1U to the container initiator 24 in the cloud computing environment 14-1 (step 208). The container initiator 24 begins processing the updated container specification 18-1U (step 210). During a volume processing stage, the container initiator 24 provides the pass-through device driver 34 with the pass-through device driver data 56 and the attributes 53 associated with the native device driver 28 (step 212).

Figure 5B:
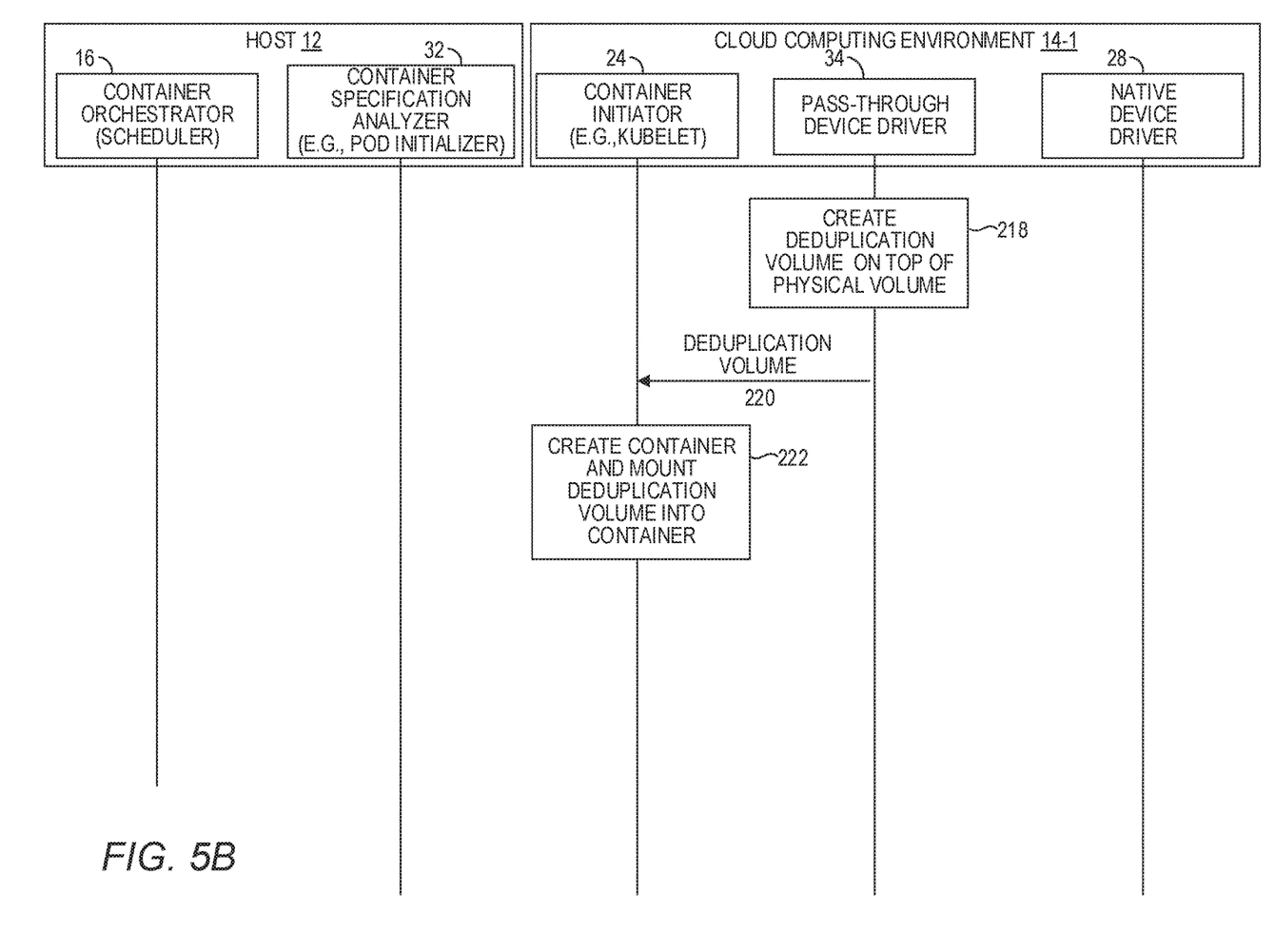

The pass-through device driver 34 provides the attributes 53 to the native device driver 28, and passes to the native device driver 28 all native device driver instructions and commands received by the container initiator 24 that are intended for the native device driver 28 (step 214). The native device driver 28 attaches the physical volume 30 to the host 20 (step 216). The message flow continues with FIG. 5B. The pass-through device driver 34 creates a deduplication data storage feature volume 38 on top of the physical volume 30 (step 218). The pass-through device driver 34 provides the deduplication data storage feature volume 38 in lieu of the physical volume 30 (step 220). The container initiator 24 creates any containers identified in the updated container specification 18-1U and mounts the deduplication data storage feature volume 38 inside such containers (step 222).

Figure 6:
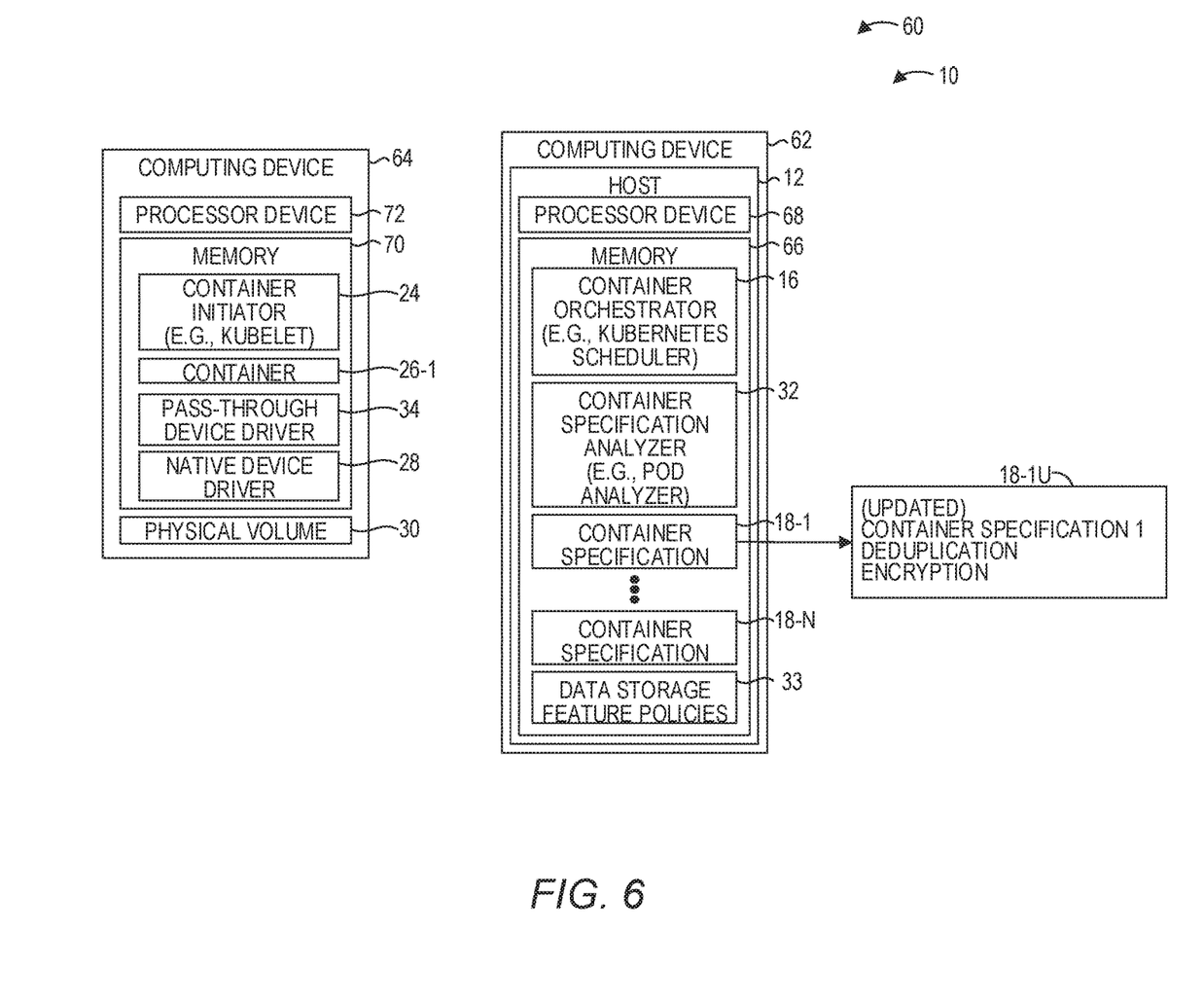
FIG. 6 is a simplified block diagram of the environment illustrated in FIG. 1 according to one example.

FIG. 6 is a simplified block diagram of the environment 10 illustrated in FIG. 1 according to one example. FIG. 6 includes a system 60 that includes one or more computing devices 62, 64. The computing device 62 includes a memory 66 and a processor device 68 coupled to the memory 66, and the computing device 64 includes a memory 70 and a processor device 72. The processor devices 68, 72 are to receive, by the container specification analyzer 32, the container specification 18-1 that identifies the container 26-1 to be initiated, the physical volume 30 to be mounted, and the native device driver 28 to communicate with to facilitate mounting the physical volume 30. The processor devices 68, 72 are further to change the container specification 18-1 to generate an updated container specification 18-1U that identifies the pass-through device driver 34 to communicate with in lieu of the native device driver 28 and identifies pass-through device driver data 56 that identifies a data storage feature to be performed on data destined for the native device driver 28. The processor devices 68, 72 are further to return the updated container specification 18-1U for processing by the container initiator 24.

It should be noted that because the container specification analyzer 32 is a component of the computing device 62, functionality implemented by the container specification analyzer 32 may be attributed to the computing device 62 generally. Moreover, in examples where the container specification analyzer 32 comprises software instructions that program the processor device 68 to carry out functionality discussed herein, functionality implemented by the container specification analyzer 32 may be attributed herein to the processor device 68.

Similarly, because the pass-through device driver 34 is a component of the computing device 64, functionality implemented by the pass-through device driver 34 may be attributed to the computing device 64 generally. Moreover, in examples where the pass-through device driver 34 comprises software instructions that program the processor device 72 to carry out functionality discussed herein, functionality implemented by the pass-through device driver 34 may be attributed herein to the processor device 72.

Figure 7:
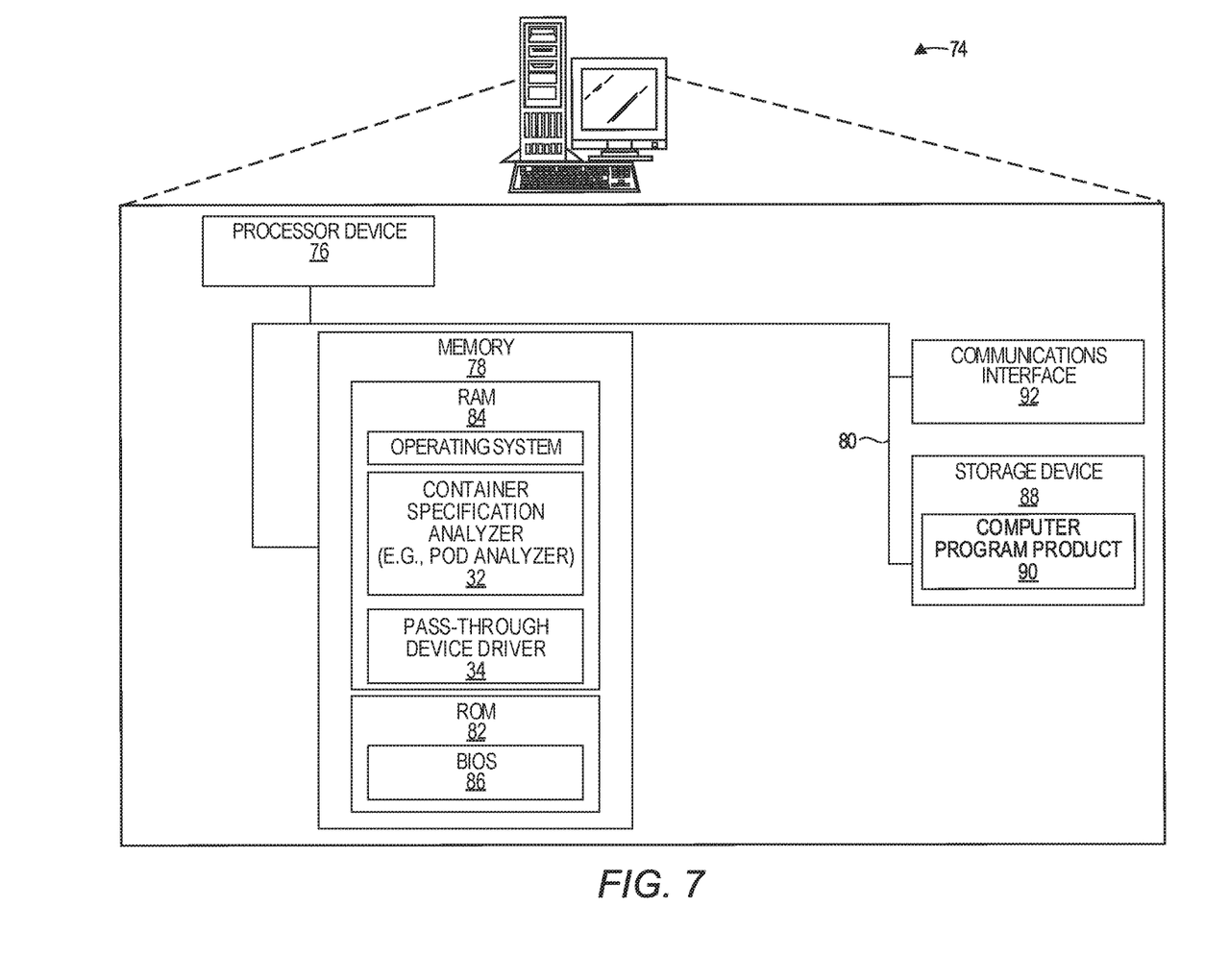
FIG. 7 is a block diagram of a computing device suitable for implementing either of the computing devices illustrated in FIG. 6.

FIG. 7 is a block diagram of a computing device 74 suitable for implementing either of the computing devices 62 or 64. The computing device 74 may comprise any computing or electronic device capable of including firmware, hardware, and/or executing software instructions to implement the functionality described herein, such as a computer server, a desktop computing device, a laptop computing device, or the like. The computing device 74 includes a processor device 76, a memory 78, and a system bus 80. The system bus 80 provides an interface for system components including, but not limited to, the memory 78 and the processor device 76. The processor device 76 can be any commercially available or proprietary processor.

The system bus 80 may be any of several types of bus structures that may further interconnect to a memory bus (with or without a memory controller), a peripheral bus, and/or a local bus using any of a variety of commercially available bus architectures. The memory 78 may include non-volatile memory 82 (e.g., read-only memory (ROM), erasable programmable read-only memory (EPROM), electrically erasable programmable read-only memory (EEPROM), etc.), and volatile memory 84 (e.g., random-access memory (RAM)). A basic input/output system (BIOS) 86 may be stored in the non-volatile memory 82 and can include the basic routines that help to transfer information between elements within the computing device 74. The volatile memory 84 may also include a high-speed RAM, such as static RAM, for caching data.

The computing device 74 may further include or be coupled to a non-transitory computer-readable storage medium such as a storage device 88, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 88 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 88 and in the volatile memory 84, including an operating system and one or more program modules, such as the container specification analyzer 32 and/or the pass-through device driver 34, which may implement the functionality described herein in whole or in part.

A number of modules can be stored in the storage device 88 and in the volatile memory 84, including, by way of non-limiting example, the container specification analyzer 32 and/or the pass-through device driver 34. All or a portion of the examples may be implemented as a computer program product 90 stored on a transitory or non-transitory computer-usable or computer-readable storage medium, such as the storage device 88, which includes complex programming instructions, such as complex computer-readable program code, to cause the processor device 76 to carry out the steps described herein. Thus, the computer-readable program code can comprise software instructions for implementing the functionality of the examples described herein when executed on the processor device 76. The processor device 76, in conjunction with the container specification analyzer 32 and/or the pass-through device driver 34 in the volatile memory 84, may serve as a controller, or control system, for the computing device 74 that is to implement the functionality described herein.

The computing device 74 may also include a communications interface 92 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

receiving, by a container specification analyzer executing on a computing device comprising a processor device, a container specification that identifies a container to be initiated, a volume to be mounted, and a native device driver to communicate with to facilitate mounting the volume;

changing the container specification to generate an updated container specification that identifies a pass-through device driver to communicate with in lieu of the native device driver and identifies pass-through device driver data that identifies a data storage feature to be performed on data destined for the native device driver; and returning the updated container specification for processing by a container initiator.

2. The method of claim 1 further comprising:

analyzing, by the container specification analyzer, the container specification to determine whether the container specification implements one or more data storage features on data destined for the native device driver;

determining, by the container specification analyzer, that the container specification fails to implement at least one of the one or more data storage features on the data destined for the native device driver; and wherein changing the container specification to generate the updated container specification is in response to determining that the container specification fails to implement the at least one of the one or more data storage features on the data destined for the native device driver.

3. The method of claim 2 further comprising accessing, by the container specification analyzer, policy data that identifies the one or more data storage features.

4. The method of claim 1 wherein the data storage feature comprises one or more of a data integrity data storage feature, a data encryption data storage feature, a data replication data storage feature, and a data deduplication data storage feature.

5. The method of claim 1 wherein receiving, by the container specification analyzer, the container specification further comprises receiving the container specification from a container orchestrator that is configured to schedule the container specification to be processed by the container initiator.

6. The method of claim 1 further comprising:
receiving, by the pass-through device driver from the container initiator, a native device driver instruction destined for the native device driver and the pass-through device driver data that identifies the data storage feature to be performed on the data destined for the native device driver;
passing, by the pass-through device driver to the native device driver, the native device driver instruction destined for the native device driver; and
implementing, by the pass-through device driver, the data storage feature to be performed on the data destined for the native device driver.

7. The method of claim 6 wherein implementing, by the pass-through device driver, the data storage feature to be performed on the data destined for the native device driver comprises:
creating a logical volume, which implements the data storage feature to be performed on the data destined for the native device driver, on top of a physical volume attached by the native device driver; and
passing the logical volume to the container initiator in lieu of the physical volume.

8. The method of claim 7 further comprising:
creating, by the container initiator, the container; and
mounting the logical volume for use by the container in lieu of the physical volume.

9. The method of claim 1 wherein the native device driver complies with a standardized device driver interface, and the pass-through device driver complies with the standardized device driver interface.

10. A system comprising:
one or more computing devices, the one or more computing devices each comprising:
a memory; and
one or more processor devices coupled to the memory;
wherein the one or more processor devices are to:
receive, by a container specification analyzer, a container specification that identifies a container to be initiated, a volume to be mounted, and a native device driver to communicate with to facilitate mounting the volume;
change the container specification to generate an updated container specification that identifies a pass-through device driver to communicate with in lieu of the native device driver and identifies pass-through device driver data that identifies a data storage feature to be performed on data destined for the native device driver; and
return the updated container specification for processing by a container initiator.

11. The system of claim 10 wherein the one or more processor devices are further to:
analyze, by the container specification analyzer, the container specification to determine whether the container specification implements one or more data storage features on data destined for the native device driver;
determine, by the container specification analyzer, that the container specification fails to implement at least one of the one or more data storage features on the data destined for the native device driver; and
wherein changing the container specification to generate the updated container specification is in response to determining that the container specification fails to implement the at least one of the one or more data storage features on the data destined for the native device driver.

12. The system of claim 11 wherein the one or more processor devices are further to access, by the container specification analyzer, policy data that identifies the one or more data storage features.

13. The system of claim 10 wherein the data storage feature comprises one or more of a data integrity data storage feature, a data encryption data storage feature, a data replication data storage feature, and a data deduplication data storage feature.

14. The system of claim 10 wherein the one or more processor devices are further to:
receive, by the pass-through device driver from the container initiator, a native device driver instruction destined for the native device driver and the pass-through device driver data that identifies the data storage feature to be performed on the data destined for the native device driver;
pass, by the pass-through device driver to the native device driver, the native device driver instruction destined for the native device driver; and
implement, by the pass-through device driver, the data storage feature to be performed on the data destined for the native device driver.

15. A computer program product stored on one or more non-transitory computer-readable storage mediums and including instructions configured to cause one or more processor devices to:
receive, by a container specification analyzer, a container specification that identifies a container to be initiated, a volume to be mounted, and a native device driver to communicate with to facilitate mounting the volume;
change the container specification to generate an updated container specification that identifies a pass-through device driver to communicate with in lieu of the native device driver and identifies pass-through device driver data that identifies a data storage feature to be performed on data destined for the native device driver; and
return the updated container specification for processing by a container initiator.

16. The computer program product of claim 15 wherein the instructions further cause the one or more processor devices to:
analyze, by the container specification analyzer, the container specification to determine whether the container specification implements one or more data storage features on data destined for the native device driver;
determine, by the container specification analyzer, that the container specification fails to implement at least one of the one or more data storage features on the data destined for the native device driver; and
wherein changing the container specification to generate the updated container specification is in response to determining that the container specification fails to implement the at least one of the one or more data storage features on the data destined for the native device driver.

17. The computer program product of claim 16 wherein the instructions further cause the one or more processor devices to access, by the container specification analyzer, policy data that identifies the one or more data storage features.

18. The computer program product of claim 15 wherein the data storage feature comprises one or more of a data integrity data storage feature, a data encryption data storage feature, a data replication data storage feature, and a data deduplication data storage feature.

19. The computer program product of claim 15 wherein the instructions further cause the one or more processor devices to:

receive, by the pass-through device driver from the container initiator, a native device driver instruction destined for the native device driver and the pass-through device driver data that identifies the data storage feature to be performed on the data destined for the native device driver;

pass, by the pass-through device driver to the native device driver, the native device driver instruction destined for the native device driver; and implement, by the pass-through device driver, the data storage feature to be performed on the data destined for the native device driver.

20. The computer program product of claim 19 wherein to implement, by the pass-through device driver, the data storage feature to be performed on the data destined for the native device driver, the instructions further cause the one or more processor devices to:

create a logical volume, which implements the data storage feature to be performed on the data destined for the native device driver, on top of a physical volume attached by the native device driver; and pass the logical volume to the container initiator in lieu of the physical volume.

* * * * *